March 28, 1939.  W. H. FITCH  2,152,546

RECUPERATOR FOR MELTING FURNACES

Filed May 1, 1937   6 Sheets-Sheet 1

INVENTOR.
WILLIAM H. FITCH
BY
ATTORNEY.

March 28, 1939.  W. H. FITCH  2,152,546
RECUPERATOR FOR MELTING FURNACES
Filed May 1, 1937  6 Sheets-Sheet 3

INVENTOR.
WILLIAM H. FITCH
BY
ATTORNEY.

March 28, 1939. W. H. FITCH 2,152,546
RECUPERATOR FOR MELTING FURNACES
Filed May 1, 1937 6 Sheets-Sheet 4

INVENTOR.
WILLIAM H. FITCH
BY
ATTORNEY.

March 28, 1939. W. H. FITCH 2,152,546
RECUPERATOR FOR MELTING FURNACES
Filed May 1, 1937 6 Sheets-Sheet 5

INVENTOR.
WILLIAM H. FITCH
BY
ATTORNEY.

March 28, 1939. W. H. FITCH 2,152,546
RECUPERATOR FOR MELTING FURNACES
Filed May 1, 1937 6 Sheets-Sheet 6

INVENTOR.
WILLIAM H. FITCH
BY
ATTORNEY.

Patented Mar. 28, 1939

2,152,546

UNITED STATES PATENT OFFICE 2,152,546

RECUPERATOR FOR MELTING FURNACES

William H. Fitch, Plainfield, N. J.

Application May 1, 1937, Serial No. 140,154

6 Claims. (Cl. 263—20)

This invention relates to a recuperator system intended for preheating air at unusually high temperatures, the air being heated to successively higher temperatures in separated recuperator units. The invention relates more particularly to a recuperator system in which the air is preheated by passing it through one set of heat exchange tubes in which the pressure is less than atmospheric and through another set of tubes in which the pressure is greater than atmospheric.

One object of the invention is to provide a recuperator design that will efficiently supply highly preheated air to melting furnaces, and in such a manner that the furnace may be constantly operated over long periods of time at the maximum production capacity of the furnace.

Recuperators as applied to most melting furnaces, and more particularly to glass melting furnaces, do not operate efficiently after they have been in operation for a few months. The result of the deterioration of the recuperator is serious interference with the production schedule of the furnace and it is usually necessary to take the furnace out of service for rebuilding or repair of the recuperator in order that the furnace may be restored to capacity production.

As an example of present practice, in the glass industry most glass tank melting furnaces of the recuperative type have a single unit recuperator in which the heat exchange tubes are fireclay tile. These are assembled in such a manner that two sets of flues are formed, one for the passage of air which enters from the atmosphere at the bottom of the recuperator and flows upward in vertical columns to the burner ports, and another set of flues for waste gases which enter directly from the furnace into the top of the recuperator and travel downward into a flue connecting the recuperator with the stack.

In the operation of the type of recuperator just mentioned, the major portion of the slag-making elements that are suspended in the waste gases collects in the top or hottest section of the waste gas flue from which it is partly removed periodically by hand tools. In a few weeks time the tile forming the heat transfer elements are attacked chemically to such an extent that leakage of preheated air into the flue gas occurs, and the furnace output is reduced. The rate of production decreases as the total amount of erosion and leakage increases, until the economic minimum is reached, at which time the furnace operation is discontinued and the recuperator repaired or rebuilt.

Furnaces of the regenerative type have also been much used in the heating of glass tanks and in other melting operations. Such installations are subject to erosion of the brickwork and to accumulation of dirt between checkers so that conditions are set up analogous to those mentioned for a recuperative furnace.

The melting zone of a modern glass tank furnace can now be operated for longer intervals than was the case a few years ago, because of the use of refractories of better quality and design. The recuperator or regenerator improvements, however, have not kept pace with the furnace proper. The duration of the effective operation of the furnace is therefore dependent to a large extent on the good physical condition of the recuperator and its ability to function efficiently and continuously.

When a glass furnace, for example, is taken out of service for repair of the ordinary type of single unit recuperator, in which the air and waste gas ducts form a single unit of the construction, it means a loss of production equivalent to the time required for cooling the furnace, rebuilding the recuperator and again heating the furnace slowly up to working temperature. This is an expensive procedure expressed in fuel, labor and tons of good glass.

With the recuperator of my improved type, the heat exchange tubes through which the air flows are arranged in a number of separate units or banks, each unit or tube bank consisting of a number of tubes or ducts supported at their ends by terminal walls which separate waste gas chambers from air chambers. Corebusters are placed inside of the heat transfer tubes to increase the heating surface and to compel the air to flow in contact with the hot surfaces of the tubes and corebusters. The recuperator is divided into two main sections according as the pressure of the air within the tubes is less or greater than atmospheric pressure. There are also considerable temperature differences between average states of the air in the two sections. In the cooler section which receives air directly from the atmosphere the air is caused to flow by suction. In the hotter section, which is next the burners, the air is caused to flow under pressure. Each section may contain one or more separate tube bank units.

An improved recuperator made in accordance with the present invention and applied to a glass melting furnace or to an open hearth furnace is illustrated in the accompanying drawings in which.

In the example illustrated in Figure 1, 2, 3 and 4 of the drawing, two similar recuperator units or sections 1 and 2 are similarly located adjacent the melting chamber 4 of a glass melting tank furnace which has a working chamber 5. The tank is of average capacity and may be used for example to furnish molten glass for the making of bottles. The waste gases leave the melting tank by the outlet 11 and pass along the flue 10 and thence downwardly into the slag chamber 6, where they separate and pass through passageways 13 and 14 toward the recuperator units 1 and 2 respectively. The air which is heated by conduction through the walls of the recuperator tubes in the units 1 and 2 is moved by the blower 7 (actuated by the motor 8) into the hot air chambers 40 and 42 respectively and thence to the hot air inlets of the furnace, which inlets lie adjacent the fuel openings 45 and 46. In front of these openings the highly preheated air mixes with atomized fuel and the flames are projected into the upper part of the melting chamber 4.

Figures 1, 2, 3, 4:
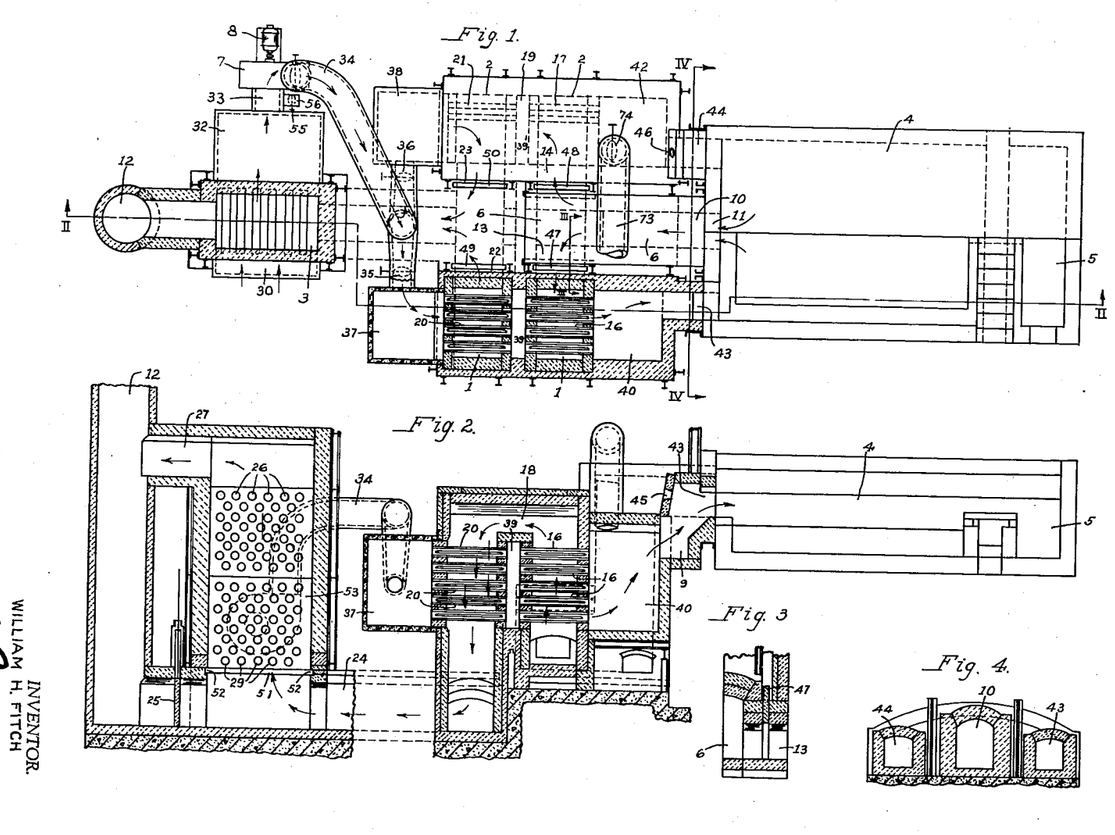
Figure 1 shows a plan view of the furnace and recuperator with certain parts of the installation in section.
Figure 2 is a longitudinal elevation of the furnace, and a section of the recuperator and some of its connections taken on the line II—II of Figure 1.
Figure 3 is a section on the line III—III of Figure 1.
Figure 4 is a section on the line IV—IV of Figure 1 taken across air and waste gas ports adjacent one end of the glass furnace.

Returning again to a consideration of the flow of the waste gases into the recuperator units, the course of these gases in the recuperator unit 1 will now be described. The waste gases that leave the passageway 13 toward the recuperator unit 1 rise up between the heat transfer tubes 16, through which the air inside the tubes gets its highest degree of preheating. The waste gases then turn horizontally along the duct 18 and thence downwardly between the heat transfer tubes 20, after which they move through the ducts 22 and 24 in succession and thence upwardly around the tubes 29 and 26 in the third recuperator unit 3 from which they pass through the conduit 27 into the stack 12. The waste gases that leave the passageway 14 toward the recuperator unit 2 rise up between the heat transfer tubes 17, turn and flow through the duct 19, descend between the heat transfer tubes 21, and pass on through the duct 23 into the duct 24 where they join the waste gases from the recuperator unit 1 in heating the recuperator unit 3.

Air to be preheated for the combustion of fuel in the burners is caused to move through the recuperator system as mentioned above by the blower 7 which normally draws air through the recuperator unit 3 and pushes it through the recuperator units 1 and 2. Atmospheric air is drawn through any suitable means for entrapping solid impurities and then into the first bank of tubes 26 in the recuperator unit 3. On leaving the outlets of these tubes the heated air passes downdown through the air chamber 30 into the second bank of tubes 29 which are hotter than the upper bank of tubes 26. The tubes 29 discharge into an air chamber 32. The heated air is then drawn through the conduit 33 and through the fan 7 which raises the pressure of the heated air and pushes it through the conduit 34 from which it normally divides into two air streams which are further heated in the recuperator units 1 and 2 respectively.

The course of the hot air stream that passes through the recuperator unit 1 will first be described. This stream of heated air passes through the chamber 37 into the interior of the heat transfer tubes 20, then into the chamber 39 and then to the interior of the heat transfer tubes 16 from which it passes successively through the chamber 40 and the air port 43 into the space in front of the burner opening 45. The course of the hot air stream that passes through the recuperator unit 2 lies through the chamber 38, the interior of tubes 21, the air chamber 39', the interior of tubes 17, the chamber 42 and the air port 44 into the space in front of the burner opening 46 which is similar to the burner opening 45 on the opposite side of the furnace.

The normal courses of the waste gases and of the air which is being heated have thus far been described. A number of valves or dampers are provided to shut off one or more recuperator sections or units of the recuperator system in case leakage occurs. It is very improbable, however, that more than one recuperator unit will need to be shut down at one time. When repairs are necessary in the recuperator unit 1 the damper 47 (which lies between the recuperator unit 1 and the slag chamber 6) as well as the damper 49 in the duct 22 are closed, thus shutting off the waste gases from the recuperator unit 1. The valve 35 which is adjacent the air chamber 37 is also shut off. This stops flow of air through the heat transfer tubes and the connecting air chambers in the recuperator unit 1. Similarly in the case of the recuperator unit 2 waste gases can be shut off by closing the damper 48 (which lies between recuperator section 2 and the slag chamber 6) and the damper 50 in the duct 23. The valve 36 which governs the air supply to the air passages of the recuperator unit 2 is also closed. When it is desired to shut off the recuperator unit 3, the damper 25 in the flue 24 is opened and a damper 51 is inserted in grooves 52 below the tubes 29 to shut off the passage of waste gases around the tubes 29 and 26. Atmospheric air is admitted directly to the fan 7 by opening the valve 55 in the branch tube 56 which is connected to the air tube 33. This valve 55 may also be opened at other times when it is desired to cool the fan 7.

By separating the two hotter recuperator units 1 and 2 and placing a slag chamber 6 between them in such a position that the waste gases from the glass tank furnace have to turn downward before entering the recuperator units, the major portion of the slag-making elements suspended in the waste gases is precipitated from the gases before they reach the upward passes containing the heat transfer tubes 16 or 17. With the flow of the waste gases upwardly around the heat transfer tubes in the first or hottest tube bank in the recuperator units 1 and 2 any solid or liquid material that reaches the surfaces of the cylindrical heat transfer tubes tends to fall off into the pit below and to flow back into the slag chamber. Such slag-forming material is likely to be in a liquid state in the waste gases which have just left the furnace outlet 11.

One reason for moving the air in the hotter recuperator units 1 and 2 by pressure and in the cooler recuperator unit 3 by suction is to reduce leakage by keeping to a minimum the difference in pressure between the waste gases and the air which is heated by the waste gases. The heat transfer tubes are made of more thermally conducting materials than the materials in the setting, that is the materials entering into the refractory walls which support the ends of the heat transfer tubes. This difference in materials means in general that the tubes and the walls have different coefficients of thermal expansion, the joints between the tubes and the walls are likely to leak as a result of stresses between the walls and the tubes resulting from changes of temperature. The permeability of the tubes or walls to gases is sometimes also a factor in this connection but is less important than the problem of sealing the joints between the tubes and walls. To minimize leakage from these various causes low pressure differences are therefore desirable. If the air were forced under pressure through the cooler unit 3 and then through the parallel units 1 and 2, the pressure at the air inlet of the unit 3 would have to be equal to the losses of pressure in the whole recuperator system due to leakage and friction plus the required burner pressure. The last mentioned presure may be reduced by designing the burners well and using draft control. In the case of the improved recuperator system described in detail above the maximum pressure in the cooler recuperator unit 3 will be slightly less than atmospheric. In the hotter recuperator unit 1 (or in the similar unit 2) the maximum pressure is the sum of the friction and leakage losses and the pressure needed for the burner. By thus making the pressure differences (between the air which is being preheated and the atmosphere) low, loss of preheated air in the heat exchanger is rendered insignificant and the efficiency is improved.

Another reason for having the air moved in one part of the recuperator system by suction and in the other part by pressure is to provide means for heating the air to a higher temperature than is ordinarily obtained in recuperators. While it is possible to obtain blowers constructed of suitable heat resisting alloys which will handle air up to 1500° Fahrenheit, this temperature can not be exceeded with safety. By passing the partially preheated air from the tube banks in the cooler or suction part of the recuperator system through the blower this temperature need not be exceeded. The partially preheated air is then pushed successively through sets of non-metallic refractory tubes 20 and 16, the latter set of tubes being exposed to waste gases which have just come from the furnace outlet through a duct 10 and a slag chamber 6 which are made of poorly conducting refractory materials.

Due to the nature of the waste gases leaving a glass melting furnace the outer surfaces of the sets of heat transfer tubes 16 and 17 are subject to erosive and corrosive conditions. As the waste gases are cooled these erosive and corrosive conditions are retarded and finally almost cease to exist. Consequently it is desirable to use in the hotter parts of the recuperator units tubes of very inert material even though such material does not have as good a thermal conductivity as silicon carbide. Examples of such materials for construction of the hotter tubes are bonded fused alumina and bonded mullite. In the cooler sections of the recuperator units a substance such as silicon carbide which has a high thermal conductivity (but which is somewhat less inert chemically than fused alumina or mullite) can be used for making the recuperator tubes.

A cross-over duct 73 is shown in Figure 1 with a damper 74. Heated air may be projected through this duct 73 from recuperator unit 1 (for example when recuperator unit 2 is shut off) to supply hot air at the burner opening 46 as well as at the burner opening 45 which the recuperator unit 1 normally serves. At the burner opening 46 preheated air is normally provided from the recuperator unit 2.

Figures 5, 6, 7, 8, 9:
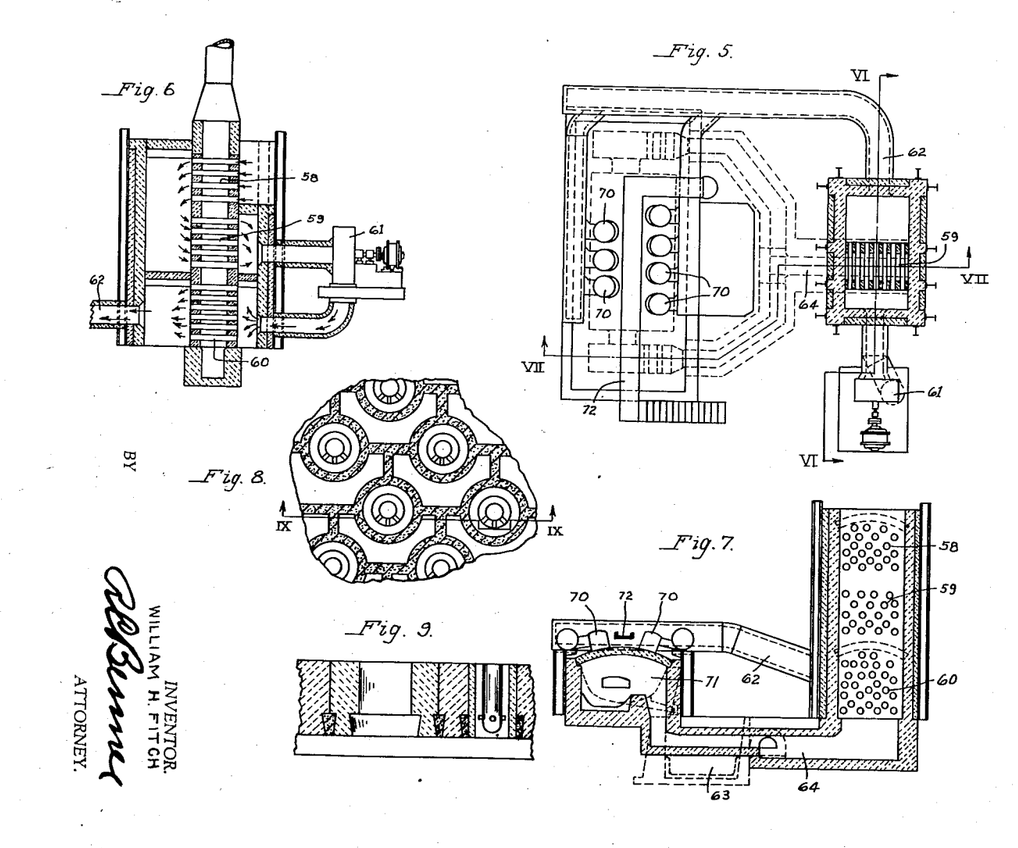
Figure 5 is a plan view of an open hearth furnace and an attached recuperator that is shown in horizontal section.
Figure 6 is a sectional elevation of the recuperator for the open hearth furnace taken on the line VI—VI of Figure 5.
Figure 7 is a sectional elevation of the open hearth furnace and recuperator taken on the line VII—VII of Figure 5.
Figure 8 is a fragmentary sectional elevation illustrating the mounting of recuperator tubes in a supporting wall.
Figure 9 is a section on the line IX—IX of Figure 8.

Figures 5, 6 and 7 of the drawing illustrate an open hearth furnace with a connected recuperator which is divided into two principal sections. Such a furnace may be used for melting steel for example. Since in many applications of this open hearth furnace the waste gases do not contain much slag-forming material, a more compact three-bank recuperator system is shown in Figures 5, 6 and 7. Atmospheric air enters the heat transfer tubes in the tube bank 58 and passes through them to a chamber where it turns downwardly and then passes through the tubes in the tube bank 59 whence it is drawn toward the blower 61 and pushed through the tubes in the tube bank 60 from which the highly heated air passes through the duct 62 to the space in front of the burner openings 70.

The waste gases pass from the combustion chamber through a slag chamber 63 and then through a flue 64 from which they pass upwards around the heat transfer tubes in the banks of tubes 60, 59 and 58.

The recuperator arrangement which has just been described does not permit shutting off the flow of waste gases across one bank or set of recuperator tubes while other banks or sets are still in use. It does, however, show one important feature of the tank furnace first described, namely the movement of air through one or more sets of recuperator tubes by suction and the movement of air through the hotter recuperator tubes under pressure.

The mounting of the heat transfer tubes in the terminal supporting walls (for either of the types of furnace described above) is illustrated in Figures 8 and 9. The tiles which support the terminal portions of the recuperator tubes are made of a poorly conducting refractory such as fireclay. These tiles are provided with semicircular grooves or quadrantal grooves which combine to form circular openings in the tube terminal walls of the recuperator chamber. The curved edges of these openings are undercut to make room for packing in a plastic cement while sealing the gaps between the recuperator tubes and the supporting walls. This cement when heated tends to expand through the narrower gaps between the tubes and the tiles, thus helping to prevent leakage through the tube terminal wall. When a defective tube has to be removed during a repair period, cement is chiseled out of the corresponding joints sufficiently to allow the defective tube to be removed and replaced.

Walkways 72 are shown in Figures 5 and 7. These are built over and around the recuperator and provide means of access to burner valves and observation points.

Many different arrangements of banks of recuperator tubes may be made in the recuperator system illustrated in Figures 1, 2, 3 and 4. These arrangements may conveniently be described by means of terminology borrowed from the electrical art. Attention is drawn for example particularly to the direction of flow of waste gases through the recuperator system which is made up of any number of recuperator units that may appear desirable. In the recuperator system shown in Figures 1 and 2, for example, the recuperator sections 1 and 2 are aranged in parallel and the recuperator unit 3 is arranged in series with the parallel combination just mentioned. The recuperator unit 3, as shown particularly in Figure 2, has a vertically upward passage in which the waste gases from sections 1 and 2 combine.

This recuperator unit 3 can be replaced by a recuperator unit similar to the recuperator unit 1 in which the waste gases pass alternately upwardly and downwardly, the positions of the air and gas inlets and outlets being adjusted accordingly. Again the recuperator unit 3 shown in Figures 1 and 2 can be duplicated, the recuperator 1 being connected in series with one recuperator unit 3, and the recuperator unit 2 being connected in series with the second recuperator unit 3.

In the case of the open hearth furnace described in lines 43 to 74, inclusive of page 3, a combination of recuperator units similar to those indicated at 1, 2 and 3 in Figure 1 can be used instead of the recuperator unit shown particularly in Figure 6.

Figures 10, 11:
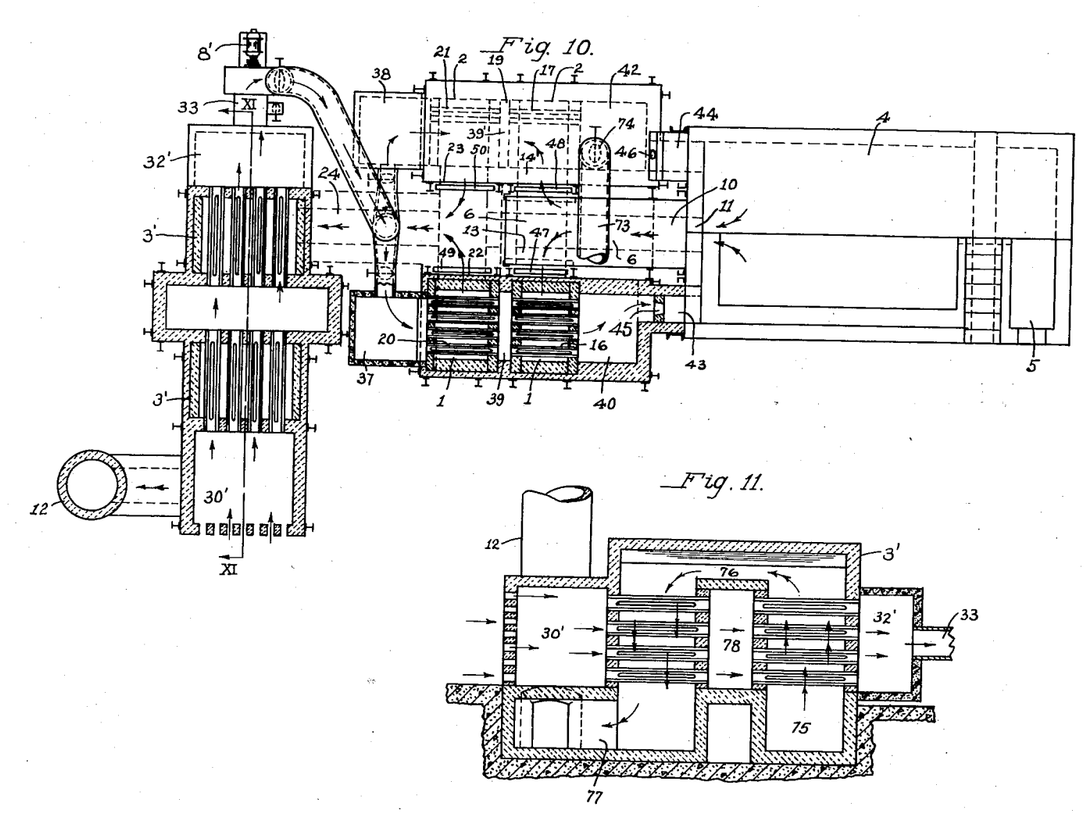
Figure 10 is a plan view partly in section of a modification of the installation shown in Fig. 1.
Figure 11 is a sectional elevation on the line XI—XI of Fig. 10.

In the modification illustrated in Figures 10 and 11 atmospheric air passes through a screen into a chamber 30' situated nearly above a waste gas passage 77 and then passes through a number of recuperator tubes arranged in parallel into a mixing chamber 78. The air passes out of the mixing chamber through another set of recuperator tubes, whose average height is substantially the same as that of the first set of recuperator tubes, into a mixing chamber 32' and a duct 33 that leads to a pump actuated by means of a motor 8'. The further course of the heated air is similar to that described in connection with Figure 1. The course of the hot air is indicated by single-headed arrows. The course of the furnace gases on the other hand is indicated by means of double-headed arrows. The course of waste gases from the furnaces 4 through the parallel recuperator units 1 and 2 is the same as described in connection with Figures 1 and 2. From the duct 24 the waste gases pass into the lower portion 75 of the recuperator unit 3', then up in between the recuperator tubes in the first tube bank of this unit to the horizontal duct 76, and then down across the second tube bank of this unit to the duct 77 through which they pass to the stack 12.

Figure 12:
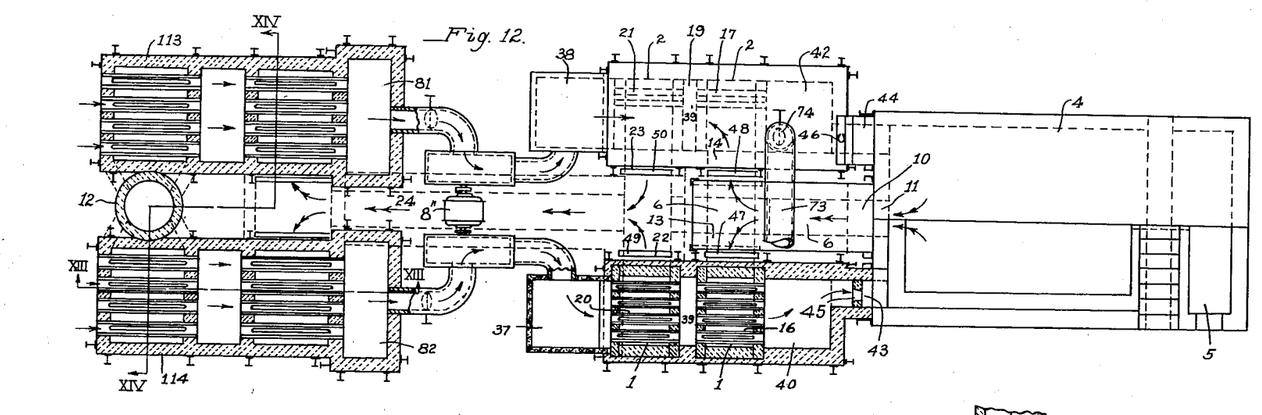
Figure 12 is a plan view partly in section of a further modification of the installation shown in Fig. 1.
Figure 13:
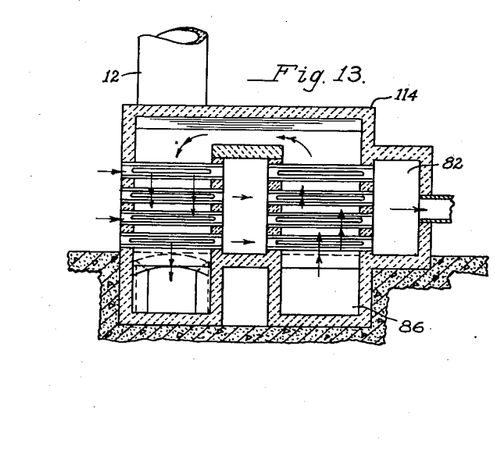
Figure 13 is a sectional elevation on the line XIII—XIII of Fig. 12.
Figure 14:
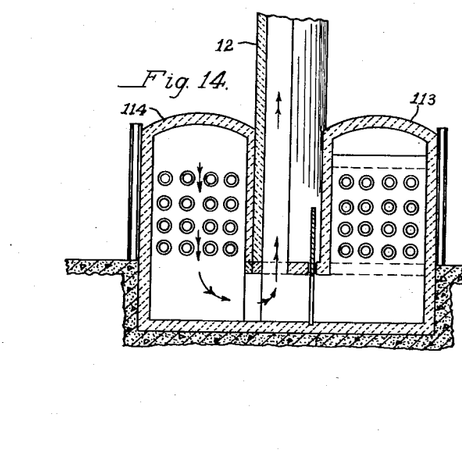
Figure 14 is a sectional elevation on the line XIV—XIV of Fig. 12.

In the modification illustrated in Figures 12, 13 and 14 atmospheric air enters two parallel recuperator units 113 and 114 whose air inlet ends are arranged on either side of the stack 12. The course of the air which is being preheated is shown for each of these parallel units in Figure 13. The air is drawn from the terminal mixing chambers 81 and 82 by means of similar pump located on opposite sides of the recuperator installation and driven by the motor 8''. The preheated air then passes at increased pressure into the mixing chambers 37 and 38 belonging to the recuperator units 1 and 2 respectively. The course of the air in these units and then on to the furnace is the same as described in connection with Figures 1 and 2. The waste gases pass from the duct 24 into lower portions 86 of the parallel recuperator units 114 and 113. The course of the waste gases through the parallel recuperator units 114 and 113 is illustrated by means of the double-headed arrows in Figures 12 and 13.

Figure 15:
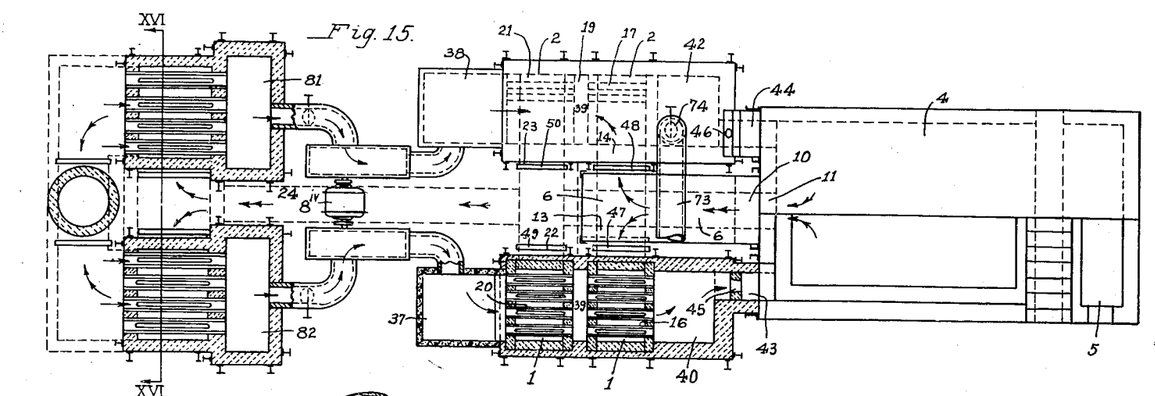
Figure 15 is a view generally similar to Figure 12 in which double-deck recuperators similar to that shown at 3 in Figure 2 are substituted for the recuperator units 113 and 114.
Figure 16:
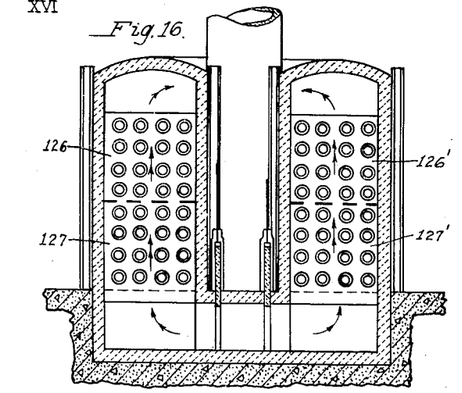
Figure 16 is a sectional elevation taken on the line XVI—XVI of Fig. 15.

In the modification shown in Figures 15 and 16 atmospheric air enters two upper banks of recuperator tubes 126 and 126' arranged in parallel and passes through the interior of the tubes in parallel horizontal directions. The partially preheated air issues from these banks of tubes and enters parallel banks of recuperator tubes 127 and 127' which it traverses in a direction opposite to its previous direction in 126 and 126'. The air is then drawn by means of fans or pumps operated by the motor $8^{iv}$. The preheated air is then forced by the respective fans through recuperators similar to 1 and 2 (shown in Fig. 1) as indicated by the single-headed arrows in Figure 15.

Figure 17:
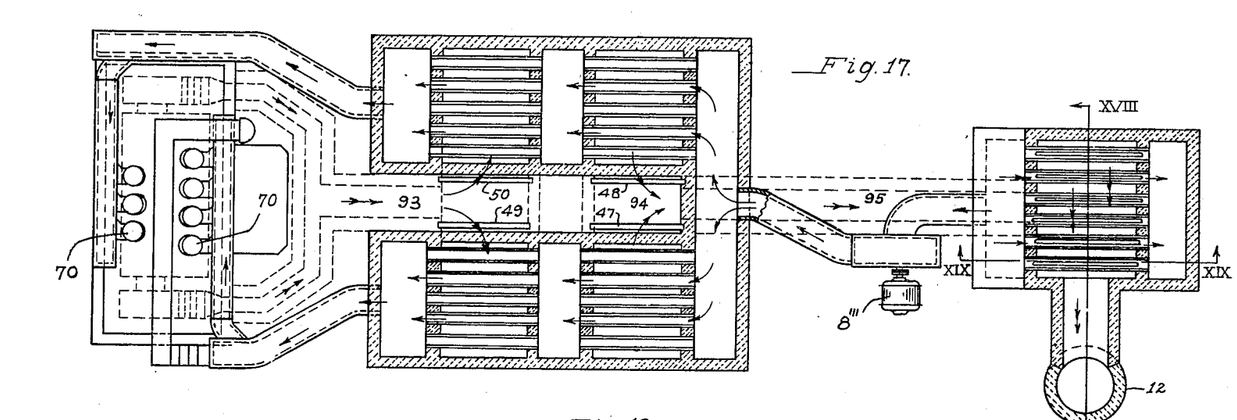
Figure 17 is a plan view partly in section of a modification of the installation shown in Figures 5, 6 and 7.
Figure 18:
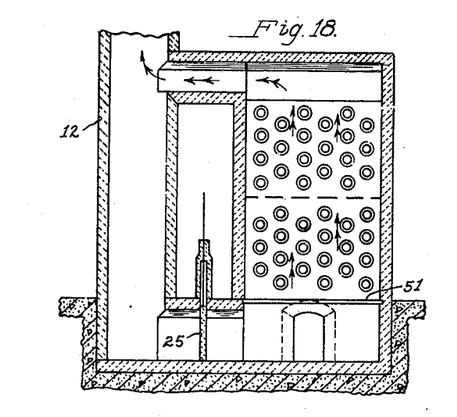
Figure 18 is a sectional elevation on the line XVIII—XVIII of Fig. 17.
Figure 19:
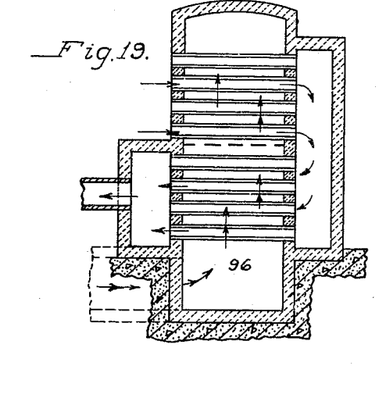
Figure 19 is a sectional elevation on the line XIX—XIX of Fig. 17.

In the modification illustrated in Figures 17, 18 and 19 the low pressure recuperator shown in Figures 5, 6 and 7 is duplicated. The course of the waste gases is indicated by means of double-headed arrows and the course of the air under treatment is indicated by means of single-headed arrows. The high pressure recuperator unit here employed is obviously very different from that used in the corresponding positions in Figures 5, 6 and 7. The former high pressure recuperator unit is of the type illustrated at 1 and 2 in Figure 1.

Many variations can be made in the arrangement of the recuperator units and in the materials of which the heat transfer tubes are made without departing from the invention which is defined within the compass of the following claims.

I claim:

1. A recuperator system for supplying highly preheated air to a furnace, said system comprising a cooler section adjacent the stack and a plurality of interchangeable hotter sections adjacent the furnace, a pump for drawing air from the atmosphere through heat transfer tubes in said cooler section and for forcing the heated air thus drawn to the pump on through heat transfer tubes in said hotter section to space in front of the fuel outlet and into the furnace, and means for diverting the flow of air and of waste gases from any of the recuperator sections to facilitate repairs in the eliminated section without shutting off the supply of heated air to the furnace.

2. A recuperator system for supplying highly preheated air to a continuous furnace having a plurality of burners, said system comprising a recuperator unit containing heat transfer tubes through which air is drawn from the atmosphere, two other recuperator units arranged in mutually parallel relationship and to which heated air is supplied from the first recuperator, a pump for drawing the air through the first recuperator unit and then forcing it through the two parallel recuperator units, and valves for shutting off the flow of waste gases and air from any one of the recuperator units whereby the remaining recuperator units supply hot air to their connected burners during repair of the isolated recuperator.

3. A recuperator system for continuous furnaces heated by a plurality of burners, said system comprising a plurality of recuperator units arranged in parallel relationship and each of which supplies air to one or more burners, each of said recuperator units containing a duct for burned gases in which the burned gases are conected successively in vertically opposite directions across banks of heat transfer tubes composed of non-metallic slag-resistant material, a pump for supplying preheated air under pressure to said heat transfer tubes, a conduit leading from the hot air outlet of each recuperator unit to the burner which it supplies, bypass valves for shutting off the flow of waste gases and of hot air through any one of the recuperator units, and a primary recuperator unit heated by waste gases that have passed through the first mentioned recuperator units, air being drawn through the heat transfer tubes of said primary recuperator unit by said pump 4. The recuperator system described in claim 2 in which the waste gases from the furnace are first conducted downwardly from the burners to a slag pit and then upwardly around a bank of heat transfer tubes in each of the parallel recuperator units.

5. The recuperator system described in claim 1 in which the heat transfer tubes of the cooler recuperator section are composed of bonded silicon carbide and the heat transfer tubes of the higher temperature recuperator sections are made of bonded fused alumina.

6. The recuperator system described in claim 5 in which one or more of the recuperator tubes is provided with an internal cylindrical member that confines the flow of air in a portion of such tube to a thin layer adjacent the inner surface of the tube.

WILLIAM H. FITCH.